(12) United States Patent
Huenink et al.

(10) Patent No.: US 7,048,071 B1
(45) Date of Patent: May 23, 2006

(54) ADJUSTABLE LINK ASSEMBLY

(75) Inventors: Brian Mark Huenink, Hudson, IA (US); Robert Lee Wood, Jr., Waterloo, IA (US); Michael Dean Kollath, Dunkerton, IA (US)

(73) Assignee: Deere & Company, Moline, IL (US)

( * ) Notice: Subject to any disclaimer, the term of this patent is extended or adjusted under 35 U.S.C. 154(b) by 1 day.

(21) Appl. No.: 11/012,649

(22) Filed: Dec. 15, 2004

(51) Int. Cl.
*A01B 59/043* (2006.01)
*F16B 7/06* (2006.01)

(52) U.S. Cl. ........................................ 172/439; 403/46
(58) Field of Classification Search ................. 172/439, 172/677, 679, 446, 448; 403/43–48, 307–313
See application file for complete search history.

(56) References Cited

U.S. PATENT DOCUMENTS

| | | | |
|---|---|---|---|
| 2,790,658 A * | 4/1957 | Robinson ..................... | 403/44 |
| 2,878,043 A | 3/1959 | Edman et al. ................ | 287/60 |
| 4,126,057 A | 11/1978 | von Allworden et al. ..... | 74/586 |
| 4,194,757 A | 3/1980 | Lucas et al. ............ | 280/461 A |
| 4,295,389 A | 10/1981 | Geisthoff et al. ............. | 74/586 |
| 6,056,069 A | 5/2000 | Hagen et al. ................ | 172/679 |
| 6,609,575 B1 | 8/2003 | Crabb ........................ | 172/439 |

OTHER PUBLICATIONS

Deere & Co., "Rockshaft and Three-Point Hitch", Operator's Manual, 7600-7800 Tractors, p. 50-15, 1992.

* cited by examiner

*Primary Examiner*—Thomas B. Will
*Assistant Examiner*—Alexandra Pechhold

(57) ABSTRACT

An adjustable link assembly includes a pair of coupling yokes, each having a threaded rod projecting therefrom. First and second lock members projecting from the corresponding first and second yokes. The first and second yokes are threadably coupled to opposite ends of a threaded central body. The body has a central non-cylindrical adjusting portion located between first and second indexing portions. A bracket is slidable over the body. The bracket is rotatable with respect to the body when the bracket is positioned over the indexing portions and being non-rotatably coupled to the body when the bracket is positioned over the central adjusting portion. A lever is pivotally coupled to the bracket so that an end of the lever may be coupled to either of the lock members to prevent rotation of the central body relative to the yokes.

3 Claims, 1 Drawing Sheet

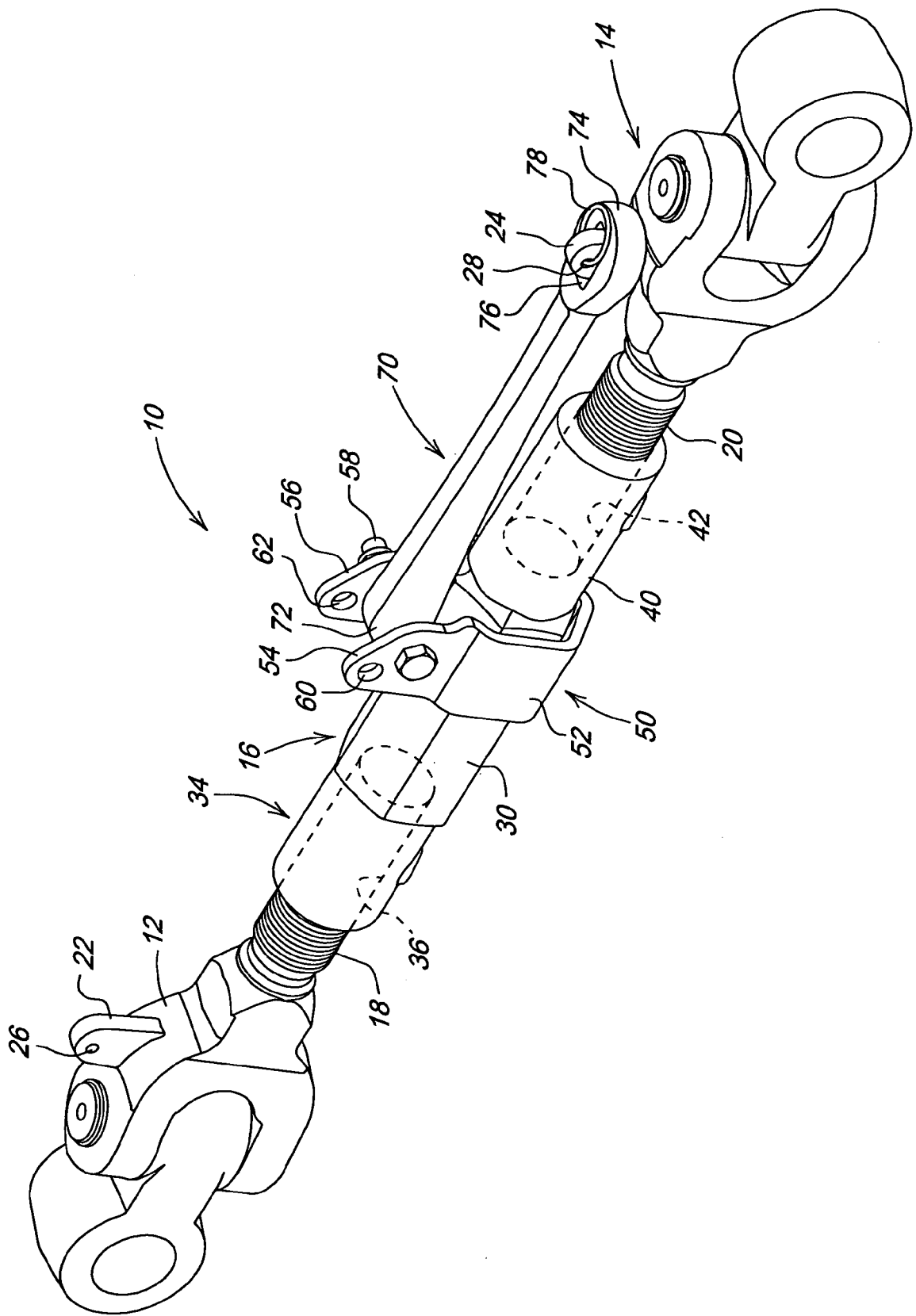

ADJUSTABLE LINK ASSEMBLY

BACKGROUND

The present invention relates to an adjustable link assembly.

Agricultural vehicles, such as tractors typically include a hitch assembly, such as a 3-point hitch, for coupling an implement to the tractor. Current production 3-point hitch systems normally include two lower draft links and an adjustable top link or center link. The length of the adjustable link is adjusted by rotating a lockable turnbuckle. Turnbuckle rotation is aided by a lever that creates a mechanical advantage so that no tools are needed to rotate the turnbuckle, even while under load. The lever can also perform a locking function to prevent turnbuckle rotation.

Some known adjustable links have included a lever pivotal at a fixed location on the link, such as shown in U.S. Pat. No. 2,878,043 issued 17 Mar. 1959 and in U.S. Pat. No. 4,194,757 issued 25 Mar. 1980. But with such designs adjustment may be difficult if other devices or objects interfere with the travel path of the lever during link adjusting.

Other adjustable links have included levers which are pivotal on a bracket which can slide over the body of the turnbuckle. As seen in U.S. Pat. No. 6,609,575 issued 26 Aug. 2003 and in U.S. Pat. No. 6,056,069 issued 2 May 2000, the turnbuckle can have a hexagonal-shaped or square-shaped body portion and a bracket with a matching hexagonal or square-shaped opening. A drawback of these designs is that the locking lever can be locked only when the lever is pivoted in one direction. Also, in U.S. Pat. No. 6,056,069 the turnbuckle body has a cylindrical portion at only one end so that the lever bracket must be moved to this one end before the lever and bracket can be rotated or indexed with respect to the turnbuckle. This is a drawback because other objects/devices, such as hydraulic valve stacks and hoses, may interfere with moving the bracket to this one end or may interfere with rotation of the lever when the bracket is at this one end, such as when the hitch is raised to full height and the center link is in its shortest position.

It would be desirable to have an adjustable link wherein the locking lever can be locked when pivoted in either direction and which can be rotated with respect to the turnbuckle at either end thereof.

SUMMARY

Accordingly, an object of this invention is to provide an adjustable link wherein the locking lever can be locked when pivoted in either direction.

A further object of the invention is to provide such an adjustable link wherein the locking lever can be rotated with respect to the turnbuckle at either end thereof.

These and other objects are achieved by the present invention, wherein an adjustable link assembly includes a pair of coupling yokes, each having a threaded rod projecting therefrom. First and second lock members projecting from the corresponding first and second yokes. The first and second yokes are threadably coupled to opposite ends of a threaded central body. The body has a central non-cylindrical adjusting portion located between first and second indexing portions. A bracket is slidable over the body. The bracket is rotatable with respect to the body when the bracket is positioned over the indexing portions and being non-rotatably coupled to the body when the bracket is positioned over the central adjusting portion. A lever is pivotally coupled to the bracket so that an end of the lever may be coupled to either of the lock members to prevent rotation of the central body relative to the yokes.

BRIEF DESCRIPTION OF THE DRAWINGS

The sole FIGURE is a perspective view of an adjustable link assembly according to the present invention.

DETAILED DESCRIPTION

Referring to the FIGURE, an adjustable link assembly 10 includes first and second coupling yokes 12 and 14, and a link body or turnbuckle 16. Each yoke 12, 14 has a rod or post 18, 20 with external threads formed thereon. Each yoke 12, 14 also has a locking stub or post 22, 24 projecting radially outwardly therefrom. Each stub 22, 24 has bore 26, 28 extending through a tip portion thereof.

Link body 16 has a central portion 30 which has a non-cylindrical, multi-sided profile. A first cylindrical reduced diameter section 34 extends axially from central portion 30 towards first yoke 12, and includes an internally threaded bore 36 which threadably receives threaded post 18. A second cylindrical reduced diameter section 40 extends axially from central portion 30 towards second yoke 14, and includes an internally threaded bore 42 which threadably receives threaded post 20. In a known manner the various threads are formed so that the link assembly increases in length when link body 16 is rotated in one direction, and so that the link assembly decreases in length when link body 16 is rotated in the opposite direction.

A bracket 50 is mounted on the body 16. Bracket 50 is slidable over the entire length of the body 16. Bracket 50 includes a generally U-shaped non-cylindrical multi-sided mounting part 52 which matingly receives the multi-sided central portion 30 of body 16 and which partially surrounds central portion 30. Thus, part 52 can slide axially with respect to central portion 30, but it cannot rotate with respect to link body 16 as long as part 52 is receiving central portion 30. Part 52 can rotate with respect to link body 16 when part 52 is moved axially off of central part 30 and onto either smaller diameter sections 34 or 40.

A pair of legs 54 and 56 project away from opposite ends of part 52. A pivot pin 58 extends through a pair of and between legs 54, 56, and is received by a pair of pivot bores (not shown). Another pair of aligned bores 60, 62 extend through an upper end of legs 54, 56. If link 10 is used as a center link in a three-point hitch assembly (not shown), then bores 60, 62 can receive a storage pin (not shown) which can be used to hold the link 10 up and out of the way when it is not in use.

An elongated handle or lever 70 has one end 72 pivotally coupled to and receiving the pin 58. The other end 74 forms an opening 76 for receiving the locking stubs 22, 24. The handle 70 can be pivoted to the position shown in the FIGURE, wherein the opening 76 receives stub 24, and the handle can be locked in this position by a locking ring 78. The handle can also be pivoted about pin 58 and disconnected from stub 24 so that an operator can use the leverage provided by handle to rotate the link body 16 in either direction about its central axis to lengthen or shorten the link 10, as long as bracket is engaged with the multi-sided central portion 30. Alternatively, the handle 70 can be pivoted 180 degrees about pin 58, and bracket 50 can be slid over portion 30 so the opening 76 receives lug 22.

When the handle 70 is disengaged from lugs 22 and 24, bracket 50 can be slid off of central portion 30 onto either cylindrical portion 34 or 40 so that bracket 50 can be rotated about the longitudinal axis of link 10 and so that the lever 70 can be re-oriented or "indexed" with respect to the multi-sided central portion 30.

Thus, with this invention, the bracket 50 and handle 70 can be indexed with respect to the multi-sided portion 30 at either end of the link body 16 on portions 34 or 40. Also with this invention, the link body 16 can be prevented from rotating with respect to yokes 12, 14 by pivoting the lever 70 in opposite directions and into engagement with either stub 22 or 24.

While the present invention has been described in conjunction with a specific embodiment, it is understood that many alternatives, modifications and variations will be apparent to those skilled in the art in light of the foregoing description. Accordingly, this invention is intended to embrace all such alternatives, modifications and variations which fall within the spirit and scope of the appended claims.

We claim:

1. An adjustable link assembly comprising:
   first and second coupling members;
   a first lock member projecting from the first coupling member; and
   a second lock member projecting from the second coupling member;
   a central body, the first and second coupling members being threadably coupled to opposite ends of the body, the body having a multi-sided central adjusting portion, a first indexing portion extending from a first end of the central portion and a second indexing portion extending from a second end of the central portion, the central adjusting portion being positioned between the first and second indexing portions;
   a bracket slidable over the body, the bracket being rotatable with respect to the body when the bracket is positioned over the indexing portions and being non-rotatably coupled to the body when the bracket is positioned over the central adjusting portion; and
   a lever pivotally coupled to the bracket so that an end of the lever may be coupled to either of the lock members to prevent rotation of the central body relative to the coupling members.

2. An adjustable link assembly comprising:
   first and second threaded rods;
   a first lock member projecting from the first rod; and
   a second lock member projecting from the second rod;
   a threaded central body, the first and second rods being threadably coupled to opposite ends of the body, the body having a multi-sided central adjusting portion, a first indexing portion extending from a first end of the central portion and a second indexing portion extending from a second end of the central portion, the central adjusting portion being positioned between the first and second indexing portions;
   a bracket slidable over the body, the bracket being rotatable with respect to the body when the bracket is positioned over the indexing portions and being non-rotatably coupled to the body when the bracket is positioned over the central adjusting portion; and
   a lever pivotally coupled to the bracket so that an end of the lever may be coupled to either of the lock members to prevent rotation of the central body relative to the rods.

3. An adjustable link assembly comprising:
   a first coupling yoke having a first externally threaded rod projecting therefrom;
   a second coupling yoke having a second externally threaded rod projecting therefrom;
   a first lock member projecting from the first yoke; and
   a second lock member projecting from the second yoke;
   a threaded central body, the first and second rods being threadably coupled to opposite ends of the body, the body having a central non-cylindrical adjusting portion, a first indexing portion extending from a first end of the central portion and a second indexing portion extending from a second end of the central portion, the central adjusting portion being positioned between the first and second indexing portions;
   a bracket slidable over the body, the bracket being rotatable with respect to the body when the bracket is positioned over the indexing portions and being non-rotatably coupled to the body when the bracket is positioned over the central adjusting portion; and
   a lever pivotally coupled to the bracket so that an end of the lever may be coupled to either of the lock members to prevent rotation of the central body relative to the yokes.

* * * * *